United States Patent [19]
Andrews

[11] 3,746,487
[45] July 17, 1973

[54] CONVEYOR-MOLD CONSTRUCTION
[75] Inventor: Theodore E. Andrews, Kutztown, Pa.
[73] Assignee: Armstrong Cork Company, Fogelsville, Pa.
[22] Filed: Aug. 23, 1971
[21] Appl. No.: 174,008

[52] U.S. Cl............. 425/184, 425/183, 425/371, 425/817 C
[51] Int. Cl............................................. B28b 17/00
[58] Field of Search................. 425/4 C, 183, 184, 425/233, 237, 343, 348, 371, 817 C; 249/112

[56] References Cited
UNITED STATES PATENTS
3,298,064  1/1967  Taga ................................. 429/371
3,380,121  4/1968  Chittenden et al. ............ 249/112 X Primary Examiner—H. A. Kilby, Jr.
Attorney—Nichol M. Sandoe, Eugene J. Kalil et al.

[57] ABSTRACT

A conveyor-mold construction is provided for continuously producing lengths of foam plastic material comprising endless upper and lower conveyors having mold elements coupled thereon via a base plate such that the mold elements of the upper conveyor mate with the mold elements of the lower conveyor at the path of nearest approach. Each of the mold elements has a concaved molding face defined by contiguous side walls extending longitudinally along said mold element, each of the side walls terminating transversely into an edge which defines diametrally the dimensional limits of the resulting mold formed from the mold halves. The remote back face of each mold element has means for registering with the supporting base plate, each edge of the side walls of the element having means for registering with corresponding registering means on a corresponding mold element, the mold registering means of the two mold elements being mutually interlockable, such as by means of a tongue and groove register.

14 Claims, 5 Drawing Figures

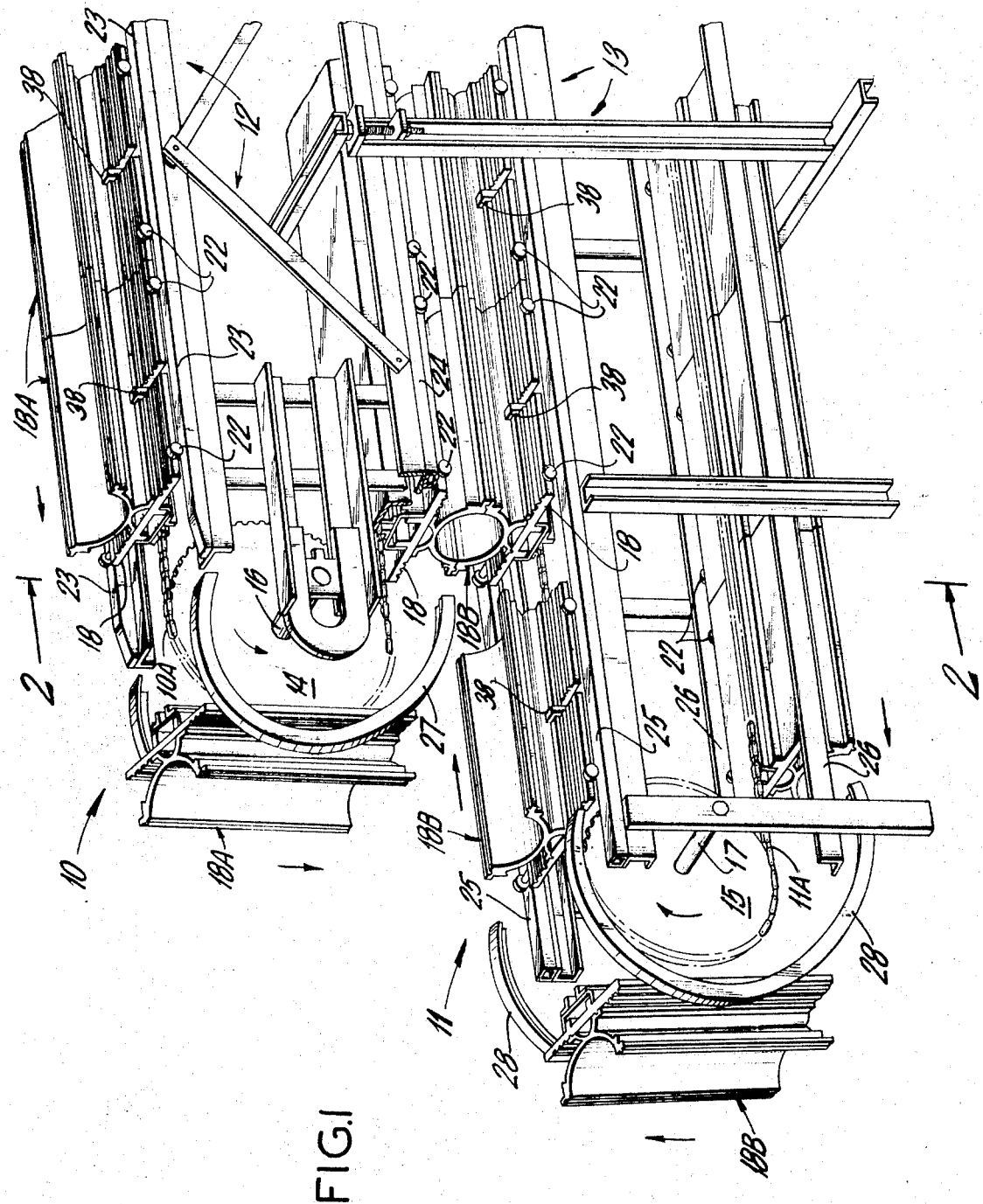

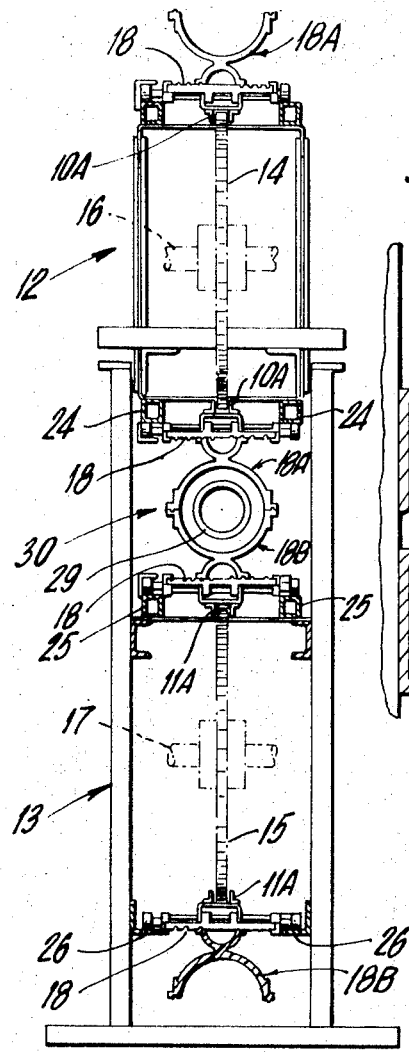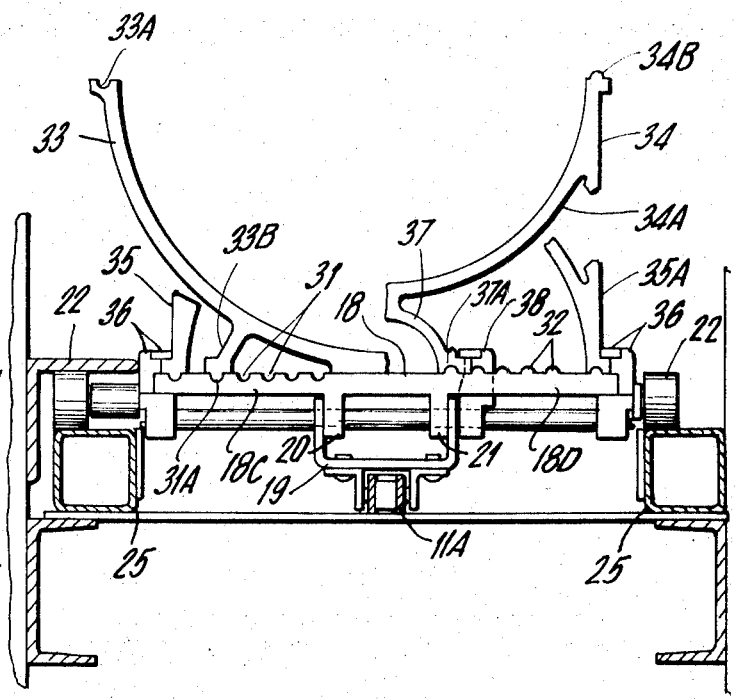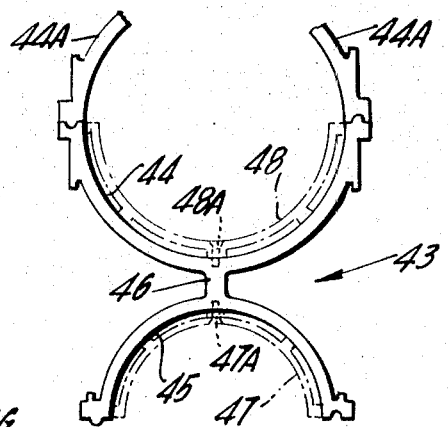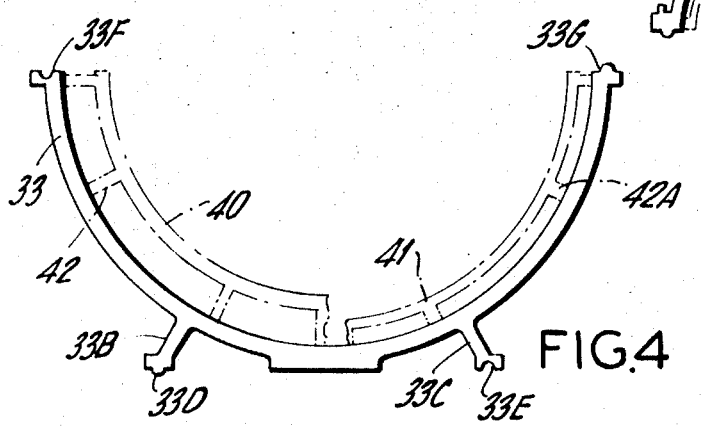

CONVEYOR-MOLD CONSTRUCTION

This invention relates to a conveyor-mold construction suitable for use in making continuous lengths or longitudinal sections of cured foamed plastic material and is an improvement over the conveyor-mold apparatus described in U.S. Pat. No. 3,118,800 which issued to Charles D. Snelling on Jan. 21, 1964.

FIELD OF THE INVENTION

It is known to produce cellular structures having excellent heat-insulative and shock-absorbing properties. Of interest are cellular products of foam plastic materials, such as expanded polystyrene, and the like, or polyurethane material formed from liquid polymeric reaction mixtures containing polyisocyanates. The reaction mixtures are polymeric materials which are either liquid at room temperature or capable of being melted at relatively low temperatures. The polymeric materials contain active hydrogen atoms which react with the isocyanate groups to form a network of cross-linked molecular chains. The polyisocyanate not only functions as a cross-linker or curative for the polymeric material but also reacts with water provided in the liquid reaction mixture to form carbon dioxide which causes the liquid reaction mixture to expand and foam, whereby a cellular structure is formed which retains its foamed cellular character after the polymer has been cross-linked or cured.

The reaction between the isocyanate and the water to form carbon dioxide and the reaction between the polyisocyanate and the polymeric material to effect a cure of the polymeric material takes place concurrently. The composition of the mixture is generally controlled so that, after the desired expansion of volume has been effected, curing obtains.

The foregoing materials have given rise to the production of foamed-in-place plastic shapes for use in electrical, shipping, aircraft and other industries where low density, high dielectric strength, high heat insulation, good shock absorbing and other properties are desired.

In producing foamed-in-place shapes, it has been necessary to employ rigid mold retaining means in order to obtain the desired surface configuration. For example, in producing conduits with the annular wall formed of foamed plastic, in order to make sure that the wall had the correct shape and that the inner and outer surface of the conduit would be substantially equally spaced from each other or substantially concentric, it was necessary to employ rigid retaining means or molding surfaces for both the inner and outer surface of the conduit. This method had its limitations in that it was difficult to produce long lengths of the conduit economically.

In the aforementioned U.S. Pat. No. 3,118,800, the disclosure of which is incorporated herein by reference, a method and apparatus are proposed for overcoming the foregoing limitations in the production of plastic articles of long lengths, such as conduits, pipes, ducts, and the like, having an annular wall of expanded porous plastic. In its essentials, the patented method comprised providing a smooth mandrel whose surface corresponds peripherally to the inner surface of the hollow cylindrical or prismatic product, such as a conduit, pipe, duct or tube, forming about the mandrel a tubular covering in sliding engagement therewith constituting the inner surface of the product, surrounding the inner surface with an envelope of flexible sheet material whose width or circumferential length corresponds substantially to the circumference of the outer surface of the product, adding a foaming plastic mixture to the space formed between the tubular covering and the surrounding envelope in an amount sufficient to fill the space after the mixture has foamed, carrying out the foaming of the mixture against the tubular covering supported by the mandrel and against the envelope of flexible material whereby to fill the space, polymerizing the mixture to form a hollow product having an annular wall of polymerized porous plastic tightly covered with said envelope material, and removing said product from the mandrel.

The mandrel is preferably employed in combination with a pair of endless upper and lower conveyors having mold halves coupled thereto in end-to-end relationship such that the mold halves of the upper conveyor mate with the mold halves of the lower conveyor at the plane of nearest approach of the conveyors whereby to define a cylindrical opening through which the mandrel extends. Thus, as plastic foam expands against the tubular covering described above, the tubular covering fills out the cavity defined by the aligned molds on the conveyors, which molds during movement of the conveyor cause the foam plastic product through mold contact to move along the mandrel and thence through a curing oven.

The foregoing type of conveyor system is also described in copending application Ser. No. 69,661, filed Sept. 4, 1970, the disclosure therein being also incorporated herein by reference.

It would be desirable to provide an improved conveyor-mold construction formed of mold elements designed to provide greater versatility of use in terms of interchangeability of parts and in terms of ease of changing mold sizes.

OBJECTS OF THE INVENTION

It is thus the object of the invention to provide an improved mold construction for continuously producing longitudinal foamed-in-place plastic articles.

Another object is to provide a conveyor-mold construction comprising upper and lower conveyors having mold elements coupled thereto and arranged in mold-mating relationship such that as the conveyors are caused to move at the same speed, the mold elements of the upper conveyor mate with the mold elements of the lower conveyor at the nearest plane of approach.

A still another object is to provide interchangeable mold elements such that each mold element has a plurality of concaved molding faces of different sizes such that by reversing the elements on the conveyor, a different size mold is obtainable when the mold elements are mated together relative to a selected concaved molding face.

These and other objects will more clearly appear when taken in conjunction with the following disclosure and the accompanying drawings, wherein:

FIG. 1 shows a section of a conveyor-mold construction comprising upper and lower conveyors having matable mold elements coupled thereto;

FIG. 2 is an end elevation view of the conveyor-mold construction of FIG. 1;

FIG. 3 is a sectional view in elevation showing the details of a supporting base plate for the mold elements shown in FIGS. 1 and 2 to illustrate the mutually cooperable registering means between mold elements of various sizes and the registering means on the base plate;

FIG. 4 illustrates in front elevation a particular concaved mold element or mold half with legs protruding from the remote back face thereof (convex face) having means for lockingly engaging the registering means on a base plate of the type shown in FIG. 3, the figure also showing phantomly portions of mold liners of various sizes which may be employed to change the size of the molding face of the mold element; and FIG. 5 depicts one embodiment of a mold element having concaved molding faces on the front and back face of the mold element of different sizes such that the same mold element can be interchangeably positioned on each of the conveyors to provide two different sized molds. In addition, mold liners are shown in phantom to provide additional size changes with the same mold element.

The mold elements provided by the invention may be employed in the continuous molding of hollow plastic articles (e.g., plastic pipes, conduits, sheaths, etc.) as described in U.S. Pat. No. 3,113,800 and copending application Ser. No. 69,661 or in the production of solid shapes.

One novel aspect of the invention resides in the versatility of design of the mold elements which are adapted to be interchangeably mountable on the same base plate carried by the conveyor. In addition, one mold element in combination with a corresponding mold element of the same configuration may be designed to provide different sizes or shapes merely by reversing or changing the position of the mold element on the base plate. Thus, the mold element may have a plurality of matable molding faces, such as back-to-back or one molding face of a particular size on each quadrant face of the element, each molding face being matable with a corresponding molding face of a duplicate molding element.

In the case where the mold elements are designed for use on a pair of upper and lower conveyors, the mold elements along the upper conveyor are positioned in end-to-end relationship and indexed in accordance with corresponding mold elements similarly positioned on the lower conveyor such that at the path of nearest approach of the two conveyors, the indexed mold elements are caused to mate together.

SUMMARY OF THE INVENTION

Stating it broadly, one embodiment of the invention is directed to at least one pair of mutually matable mold elements each adapted to be mounted to each of a piar of upper and lower endless conveyors arranged in parallel with each other, the mold elements being indexed relative to each other so that they mate along the path of nearest approach of the conveyors.

The mold element is in effect a longitudinal mold segment having a concaved molding face defined by contiguous side walls extending longitudinally along said segment, each of said side walls terminating transversely into an edge which diametrally defines the dimensional limits of the mold element. The remote back face of the mold element is provided with mounting means for lockingly registering the mold element to a supporting base plate having corresponding registering means thereon, mold registering means being disposed continuously along each edge of said side walls for mating with corresponding registering means on said other corresponding mold element by means of which a complete mold structure is provided, said mold registering means mutually interlockable against transverse displacement during longitudinal movement of the mated mold elements by the conveyor.

By using the foregoing mold elements, a mold conveyor system may be provided for use in the production of molded lengths of cured foamed plastic material. A particular mold conveyor system may comprise a pair of upper and lower conveyors extending parallel to each other, a plurality of mold-supporting base plates preferably pivotally coupled in end-to-end relationship to each of said conveyors (e.g., conveyor chains), and a framework supporting the conveyors. The conveyors are provided with tracks on each side thereof supported by said framework, the base plate supporting the mold elements having wheels disposed in riding engagement on said tracks, such that the base plates with attached mold elements ride the tracks with the movement of said conveyors. Rotatable means are provided at the ends of said conveyors, e.g., sprockets, around which the conveyors are driven, and around which the base plates are caused to negotiate. Mold elements are interchangeably coupled to each of the base plates of the upper and lower conveyors, each of the mold elements having at least one concaved molding face defined by contiguous side walls extending longitudinally along said element, each of said side walls terminating transversely in an edge which defines diametrally the dimensional limits of said mold element. The remote back face of each mold element has mounting means registering each of said mold elements to its corresponding supporting base plate having corresponding registering means thereon, locking means being provided to hold the mold elements in place. Each of the molding elements of one conveyor has mold registering means disposed continuously along each edge of the side walls thereof for mating with corresponding registering means on each of said corresponding mold elements on the other conveyor such that when the upper and lower mold elements mate during movement of the conveyor, complete mold structures are provided, the mold registering means on each of said mold elements being mutually interlockable against transverse displacement during longitudinal movement of said conveyors.

DETAILS OF THE INVENTION

One embodiment of a conveyor system utilizing the novel mold elements of the invention is disclosed in FIG. 1 comprising endless upper and lower conveyors indicated generally by numerals 10 and 11, respectively, comprising chain conveyors 10A and 11A, the conveyors being supported by upper framework 12 and lower framework 13. The chain conveyors are coupled to sprockets at the terminal ends of the system, such as sprockets 14 and 15 shown in FIG. 1, sprocket 14 being mounted on shaft 16 and sprocket 15 being mounted on shaft 17. The sprockets are caused to move in the direction of the arrows and are driven from the discharge end (not shown).

Connected to upper and lower chains 10A and 11A are mold-supporting base plates 18, the base plates (note FIG. 3) being pivotally coupled to the chains (11A) via bracket 19 coupled to ears 20, 21 extending down from the base plate. Coupled to the base plates (note FIG. 1) are mold elements or mold halves 18A and 18B.

The base plates are provided with wheels 22 which ride on tracks disposed on each side of the chain conveyors. Thus, in upper conveyor 10, upper tracks 23 are provided as well as lower tracks 24 supported by the framework as shown upon which the wheels ride during movement of the molds by the conveyor. Similarly, upper tracks 25 are provided for the lower conveyor, including lower tracks 26 (angle iron) for receiving the wheels of the base plate. The base plates are pivotally connected to the chains intermediate the ends of the base plate to enable the base plates with the attached mold elements to negotiate the turns around the sprockets. Thus, it will be noted from FIG. 1 that mold element 18A and its base plate is negotiating sprocket 14. To assure proper alignment of the molds as they negotiate sprockets 14 and 15 and mate together as shown in FIG. 1, a camming surface is provided to guide the molds and to provide proper clearance around the turn. The upper conveyor is provided with a camming surface 27 on each side thereof, the lower conveyor being similarly provided with a camming surface 28 on each side thereof. A set of the wheels on the base plate is adapted to ride the camming surface in accordance with the pivoting action of the base plate around the sprocket. As will be noted, the mold halves are in end-to-end alignment on the conveyors, and especially where the corresponding halves meet and mate at the plane or path of nearest approach between the upper and lower conveyor.

The mated mold halves provide a continuous cavity therethrough through which a mandrel may extend to provide an annular molding chamber for producing foamed plastic tubing in accordance with the teachings of U.S. Pat. No. 3,118,800 and copending application Ser. No. 69,661. The mating of the mold halves will be apparent from referring to FIG. 2 which is an end view of FIG. 1 in elevation.

FIG. 2 shows upper conveyor chain 10A and lower conveyor chain 11A with sprockets 14 and 15 phantomly indicated supported by upper and lower frameworks 12 and 13, respectively, Base plates 18 are shown connected to chains 10A and 11A, a more detailed representation being shown in FIG. 3. The mold elements 18A and 18B mate in the region indicated generally by the numeral 30 to define a cylindrical cavity as shown. By way of illustration, a cross section of a tubular mandrel 29 is shown disposed through the mold cavity and around which a foaming plastic mixture is cast as described in U.S. application Ser. No. 69,661. The mandrel has surrounding it (not shown) an envelope of flexible material and the mold cavity similarly a lining of flexible material (also not shown) between which the foaming mixture is charged. This is being done while the conveyors together with the molds are shown riding on the tracks via wheels 22 depicted more clearly in FIG. 3.

As stated hereinabove, the base plate 18 is provided with registering means by means of which the mold elements which have corresponding registering means are attached to the base plate. Referring to FIG. 3, a typical base plate is shown in end view having a plurality of parallel grooves 31 on one side 18C of the plate running longitudinally along the plate, the other side 18D of the plate having a plurality of raised projections or tongues which are the male counterparts 32 of the grooves also running parallel to each other in the longitudinal direction of the plate.

In FIG. 3, fragments of various sized mold elements 33, 34 and 35 are shown to illustrate the interchangeability of mold elements on the same base plate. In the case of mold element 33, a leg 33B is shown projecting from its back face, the leg running longitudinally along the element. The leg terminates into tongue 31A which is indexed to fit one of the grooves 31 as shown, lugs (to be described later) being employed to lock the mold element in place. The fragment of mold element 33, extends symmetrically to the other side of the mold (not shown) and has a similar leg which has a terminal groove which mates with one of the tongues 32. This will be understood by referring to the two fragment portions of mold element 35 which spans the complete width of the base plate, and has projecting legs 35 and 35A, the terminal end of which (leg 35) mates with groove 31, with the terminal end of legs 35A being a female groove which mates with one of the tongues 32. The legs are locked in place with a pair of coacting lugs 36. Actually, legs 35 and 35A define the side walls of a mold of another size that can be utilized by reversing the mold element on the base plate, the mold element being of the type shown in FIG. 5. Referring again to mold element 33, it will be noted that the side wall thereof terminates transversely to the plate into an edge 33A having a longitudinal groove running perpendicular to the plane of the drawing, the groove being designed to mate with a corresponding tongue on a mating mold element as shown in FIG. 5. The complete mold element 33 is shown in FIG. 4 with mold liners for changing the size thereof.

In the case of the fragment of mold element 34, it will be noted that its side wall 34A terminates into an edge 34B having a tongue which mates with a corresponding female groove on a mating mold element or which can be used when turned upside down and around to mate with one of the grooves 31 of the base plate, the other half of the mold element (not shown) having an edge on the side wall with a female groove for mating with a male projection or tongue of a mating mold or when turned upside down, to mate with one of the grooves 31 of the base plate. Thus, the mold registering means has a two-fold capability. It will also be noted that the mold element has a leg 37 or side wall on the back face of the element which can serve as a concaved molding face when turned upside down (note FIG. 5). The leg or side wall 37 terminates into an edge or flange 37A having a groove which mates with one of the tongues 32. A lug assembly 38 is provided for locking mold element 34 to the base plate (Note also lug 38 in FIG. 1).

It will be noted with regard to FIG. 3, that wheel 22 on the left side of the base plate extends further out than wheel 22 on the right. This is to enable the wheel to contact camming surface 28 shown in FIG. 1 as the base plate negotiates the sprocket.

Referring to FIG. 4, the complete mold element 33 of FIG. 3 is shown having legs 33B and 33C, leg 33B having tongue 33D which mates with one of the grooves 31 of base plate 18 of FIG. 3, leg 33C having a groove 33E which mates with one of the tongues 32 of base plate 18 of FIG. 3. It will be noted that the contiguous side walls of mold element 33 terminate into an edge which defines the diametral limits of the resulting mold, the edges 33F and 33G having in the case of 33F a groove for mating with a corresponding tongue of a mating mold while edge 33G mates with a groove of the same mating mold element.

FIG. 4 also illustrates one method of changing the size of the mold element by utilizing liners 40 or 41 shown as fragments to illustrate how the molding face of element 33 can be changed in size. The liners are provided with spacer legs 42 and 42A to enable support thereof against the side walls of the mold element, the liners being held to the molding face by fastening means such as screws as shown in FIG. 5.

The embodiment of FIG. 5 illustrates a mold element having more than one molding face in back-to-back relationship. Thus, a mold element 43 is shown having two concaved molding faces, front and back faces 44 and 45, respectively, joined by a web 46, the side walls of molding face 45 serving as mounting legs on base plate 18 of FIG. 3, or, in the alternative, the side walls of molding face 44 may also serve as mounting legs. It will be noted that the side walls of both the front and back faces of the mold element terminate into an edge or flange which diametrically define the dimensional limits of the resulting mold, the edges of the side walls being characterized by tongue and groove registering means for either registering with corresponding tongue and groove in the in the supporting base plate or with the tongue and groove on a mating mold element. A fragment of mating mold element 44A is shown in tongue and groove relationship with mold element 44. In this connection, this corresponds to the mating mold elements carried by the conveyors shown in FIG. 2.

As in FIG. 4, the size of the molding faces can be changed by using mold liners 47 and 48, respectively, mold liner 48 being fastened by means of screw 48A and mold liner 47 being fastened by means of screw 47A.

The mold elements are preferably made of extruded aluminous metal, that is, aluminum metal or aluminum-base alloys. Mold designs of various configurations can be extruded and cut into the desired lengths. The term "concaved molding face" used herein is made to cover any mold configuration, be it cylindrical in shape, prismatic or a combination of curved and plane surfaces according to the particular configuration it is desired to mold.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. At least a pair of mutually matable mold elements each adapted to be mounted via support means to each of a pair of endless conveyors arranged parallel to each other with the mold elements arranged in mold-mating relationship, each of said mold elements comprising,
   a longitudinal mold segment having at least one concaved molding front face defined by contiguous side walls extending longitudinally along said segment,
   each of said side walls terminating transversely into an edge which defines the dimensional limits of a mold produced by the mating mold elements,
   a remote face on the back side of said molding front face,
   said remote back face of each of the mold elements being also concaved to provide another molding face similarly defined by contiguous side walls whose edges are also provided with registering means having the two-fold capability of registering the remote back face to the supporting base plate and of being interchangeably registrable with the concaved back face of the other mold element making up the pair,
   and mold registering means disposed continuously along each edge of said side walls of the front face for mating with corresponding registering means on said other corresponding mold element of said pair by means of which a complete mold structure is provided,
   said mold registering means on said mold elements being mutually interlockable against transverse displacement during longitudinal movement of mated mold elements by said conveyor.

2. The pair of mold elements of claim 1, wherein the registering means of one of the edges of the contiguous side walls of the back face is a groove and the means on the other of said edges of said back face is a tongue which registering means are indexed to mate with corresponding tongue and grooves on said supporting base plate.

3. The pair of mold elements of claim 1, wherein the mold registering means disposed continuously along one edge of the side wall of each front face of the mold elements is a groove, and wherein the mold registering means disposed continuously along the edge of the other side wall is a tongue, such that the mold elements are capable of mating together in tongue and groove relationship to form a complete mold structure.

4. The pair of mold elements of claim 3, wherein the tongue and groove registering means of the front face of the mold elements are indexed to register interchangeably with corresponding grooves and tongues on the supporting base plate.

5. The pair of mold elements of claim 1, including mold liners attached to a corresponding molding face of each of the elements, said mold liners being selected to provide a particular molding face size.

6. A mold conveyor system suitable for use in the production of molded lengths of cured foamed plastic material which comprises,
   a pair of upper and lower endless conveyors extending parallel to each other,
   a plurality of mold-supporting base plates pivotally coupled to each of said conveyors and aligned in end-to-end relationship,
   a framework supporting said conveyors,
   tracks on each side of said conveyors supported by said framework,
   wheels on said base plate in riding engagement on said tracks, such that the base plates ride the tracks with the movement of said conveyors,
   rotatable means at the ends of said conveyors around which the conveyors are driven and around which the pivotally mounted base plates are caused to negotiate,
   a plurality of matable mold elements coupled to each of said pivotally mounted base plates on said upper and lower conveyors, each of said mold elements having at least one concaved molding front face defined by contiguous side walls extending longitudinally along said element, each of said side walls terminating transversely in an edge which defines the dimensional limits of a mold produced by the mating mold elements, a remote back face opposite the concaved molding face of each of said mold elements, means on each of said remote back faces for registering each of said mold elements to each of said supporting base plates having corresponding registering means thereon, said remote back face of each of the mold elements being also concaved to provide another molding face similarly defined by contiguous side walls capable of being interchangeably registrable with the corresponding concaved back face of the other mold element making up the mating pair, and mold registering means disposed continuously along each edge of said side walls of each front face of each mold element of the upper conveyors for mating with corresponding registering means on each of said corresponding mold element on said lower conveyors such that when the upper and lower mold elements mate at the nearest path of approach of the conveyors during movement of the conveyor, complete mold structures are provided, the mold registering means on each of said mold elements being mutually interlockable against transverse displacement during longitudinal movement of said conveyors.

7. The mold conveyor system of claim 6, wherein the registering means on one of the edges of the contiguous side walls of the back face of each mold element is a groove and the means on the other of said edges of said back face is a tongue which registering means are indexed to register with corresponding tongue and grooves on each of the supporting base plates.

8. The mold conveyor system of claim 6, wherein the mold registering means disposed continuously along one edge of the side wall of each of the front face of the mold elements is a groove, and wherein the mold registering means disposed continuously along the edge of the other side wall is a tongue, such that the mold elements mate together in tongue and groove relationship to form a complete mold structure.

9. The mold conveyor system of claim 6, wherein the registering means on one edge of the side walls of one of the molding face of each element is a groove and the means on the other edge is a tongue, and wherein the registering means on one edge of the side walls of the back molding face is a tongue and the means on the other edge is a groove, whereby the registration between mold elements is achieved by a tongue and groove relationship.

10. The mold conveyor system of claim 8, wherein the tongue and groove registering means of the front face of the mold elements are indexed to register interchangeably with corresponding grooves and tongues on the supporting base plate.

11. The mold conveyor system of claim 6, including mold liners attached to a corresponding molding face of each of the elements, said mold liners being selected to provide a particular molding face size.

12. The mold conveyor system of claim 6, wherein the rotatable means at the ends of the conveyors are sprockets and wherein the conveyors are endless chains in meshing engagement with the sprockets.

13. The mold conveyor system of claim 12, wherein the supporting base plates are pivotally attached to the chains in a manner to enable the base plates to negotiate their way around the sprockets.

14. A mold conveyor system suitable for use in the production of molded lengths of cured foamed plastic material which comprises, a pair of upper and lower endless conveyors extending parallel to each other, a plurality of mold-supporting base plates pivotally coupled to each of said conveyors and aligned in end-to-end relationship, a framework supporting said conveyors, tracks on each side of said conveyors supported by said framework, wheels on said base plate in riding engagement on said tracks, such that the base plates ride the tracks with the movement of said conveyors, rotatable means at the ends of said conveyors around which the conveyors are driven and around which the pivotally mounted base plates are caused to negotiate, camming means disposed adjacent each of said rotatable means and defining a pathway for guiding said pivotally mounted base plates around said rotatable means, said camming means being characterized by a camming surface upon which the wheels of said base plates ride as they negotiate the turns of the conveyors, a plurality of matable mold elements coupled to each of said pivotally mounted base plates on said upper and lower conveyors, each of said mold elements having at least one concaved molding front face defined by contiguous side walls extending longitudinally along said element, each of said side walls terminating transversely in an edge which defines the dimensional limits of a mold produced by the mating mold elements, a remote back face opposite the concaved molding face of each of said mold elements, means on each of said remote back faces for registering each of said mold elements to each of said supporting base plates having corresponding registering means thereon, and mold registering means disposed continuously along each edge of said side walls of each mold element of the upper conveyors for mating with corresponding registering means on each of said corresponding mold elements on said lower conveyors such that when the upper and lower mold elements mate at the nearest path of approach of the conveyors during movement of the conveyor, complete mold structures are provided, the mold registering means on each of said mold elements being mutually interlockable against transverse displacement during longitudinal movement of said conveyors.

* * * * *